Sept. 29, 1942.         B. E. STEVENS                2,297,672
                       VOLTAGE REGULATOR
                      Filed Aug. 31, 1940

INVENTOR
B. E. STEVENS
BY
Wayne B Wells.
ATTORNEY

Patented Sept. 29, 1942

2,297,672

UNITED STATES PATENT OFFICE 2,297,672

VOLTAGE REGULATOR

Bruce E. Stevens, Kew Gardens, N. Y., assignor to Bell Telephone Laboratories, Incorporated, New York, N. Y., a corporation of New York Application August 31, 1940, Serial No. 354,998

7 Claims. (Cl. 171—119)

This invention relates to regulators and particularly to regulators for maintaining constant voltage on load circuits.

One object of the invention is to provide a voltage regulator that shall employ the ferro-resonance phenomenon in an improved manner to maintain substantially constant voltage on a load circuit.

Another object of the invention is to provide a voltage regulator between an alternating current supply circuit and a load circuit with a ferro-resonance circuit connected across the supply circuit and including the primary winding of a cored transformer having a secondary winding connected to the load circuit that shall oppose the transformer primary flux by a flux of less value but which varies at a greater rate for supply circuit voltage changes.

A further object of the invention is to provide a voltage regulator between an alternating current supply circuit and a load circuit with a ferro-resonance circuit connected across the supply circuit and including the primary winding of a cored transformer having a secondary winding connected to the load circuit and a compensating winding connected to a control circuit that shall control said compensating winding to produce a flux opposing and of less value than the primary flux for supply circuit voltage changes and that shall control the compensating winding to compensate for frequency changes of the supply circuit and temperature changes.

In many types of load circuits which are connected to an alternating current source it is desirable to maintain a substantially constant voltage across a load circuit irrespective of changes in the source of supply or changes in the amount of the load. The changes in the source of supply may be voltage changes or frequency changes. It is also desirable to maintain the load circuit voltage constant irrespective of temperature changes. An example of an alternating current circuit that must have a constant voltage may be a circuit connected to the filaments of space discharge devices.

In a voltage regulator constructed in accordance with the invention the voltage across a load circuit is maintained substantially constant irrespective of changes in frequency or voltage by the source of supply, change in the load or temperature changes. The regulator is free from any moving parts and is very simple to construct and to operate.

According to the invention the voltage regulator is connected between an alternating current supply circuit and a load circuit of any suitable character. The regulator comprises a transformer having a primary winding, one or more secondary windings, and a compensating winding. All of the windings are mounted on the central leg of a three-legged core. An inductive reactor comprising two windings mounted on the central leg of a three-legged core is associated with the transformer. A ferro-resonance circuit comprising a condenser, the main winding of the inductive reactor and the primary winding of the transformer is connected to an autotransformer which is connected to a suitable power source. The ferro-resonance circuit is operated above the jumping point thereof so that the magnetic flux produced by the transformer primary winding has less variations than the supply circuit voltage variations. A compensating circuit comprising a resistance element, the second winding of the inductive reactor or retardation coil, the compensating winding of the transformer and the transformer primary winding is connected across the autotransformer which serves as a source of alternating current. The principal object of the compensating circuit is to set up a magnetic flux in the core of the transformer, which is smaller than the flux produced by the primary winding but which opposes the primary flux and changes at a rate more nearly the same as the supply circuit voltage variations. If so desired the compensating circuit may not include the primary winding of the transformer. In such a case more turns should be added to the compensating winding on the transformer. The second winding of the retardation coil and the compensating winding of the transformer are similar in size and are connected in series opposition.

The transformer has a non-linear magnetization characteristic so that the voltage supplied to the secondary winding has a much less variation than the voltage variations of the alternating current source. In the ferro-resonance circuit the capacity reactance of the condenser is greater at all times than the inductive reactance of the retardation coil and the transformer. The total impedance of the ferro-resonance circuit is essentially the difference between the condenser reactance and the reactance of the retardation coil and the transformer. Accordingly, if the supply circuit voltage is increased, the inductive reactance decreases and the total impedance of the ferro-resonance circuit increases so that the current flow through the circuit does not increase at as great a rate as that of the supply circuit voltage. This relatively small increase of current flow through the transformer, together with the decreasing impedance of the transformer, results in a much smaller per cent increase of transformer voltage as compared with the increase in voltage of the supply circuit. In a like manner when the supply circuit voltage decreases there is a much smaller percentage decrease of transformer voltage as compared with the supply circuit voltage decrease.

The compensating circuit produces a flux in the core of the transformer which opposes the primary flux but which is less and changes at a considerably greater rate. This opposition flux in the core of the transformer serves to insure that the output voltage supplied to the secondary winding or windings is substantially constant irrespective of the changes in the supply circuit voltage. A resistance in series with the compensating circuit is provided to adjust this circuit according to the compensating values required.

A second condenser shunted by a retardation coil is connected across the windings in the compensating circuit to effect compensation for frequency changes and temperature changes. The circuit comprising the second condenser in parallel with the second retardation coil is tuned to the normal frequency of the source of supply. If the frequency of the source goes above normal value, the compensating circuit comprising the second condenser and the second retardation coil is untuned so that the current through it becomes leading and offsets the lagging current drawn through the resistance. This action assists the compensating circuit in opposing the flux of the primary winding in the core of the transformer. If the frequency of the source falls below normal value, the frequency and temperature compensation circuit becomes untuned so that the current through it becomes lagging and aids the lagging current drawn through the resistance. This operation opposes the action of the compensating circuit in opposing the flux of the transformer primary winding.

Temperature changes in the voltage regulator affect the quality of the regulating operation. A temperature increase tends to reduce the capacity of the two condensers in the regulator whereas a temperature decrease tends to increase the capacities of the two condensers. In certain types of condensers an opposite effect is produced by temperature changes. The change in the capacity of the condenser in the temperature compensating circuit always acts to oppose the action of the change in capacity of the condenser in the ferro-resonance circuit which is caused by temperature changes. When there is a temperature change, the impedances of the two condensers are chiefly affected. If the temperature rises, the capacities of the two condensers are reduced. The reduction of the capacity of the condenser in the temperature compensation circuit tends to draw a lagging current which aids the lagging current drawn through the resistance and opposes the effect of the compensation circuit in opposing the primary flux in the transformer to maintain the resultant magnetic flux substantially constant. If the temperature decreases the capacity of the condenser increases. This causes the temperature compensating circuit to draw a leading current. The leading current assists the compensating circuit in producing a flux to oppose the flux of the primary winding to maintain the resultant magnetic flux in the transformer substantially constant.

The core of the main retardation coil is operated in a saturated condition. The core of the transformer may or may not be operated in a saturated condition. If the transformer core operates above the knee of its magnetization curve only a small change in magnetic flux is produced by a change of current in the ferro-resonance circuit. This means that the size of the compensating winding in the transformer need not be so large to effect a compensating action to maintain constant voltage. If the transformer core is operated below the knee of the magnetization curve, then a larger change in magnetic flux is produced by the change of current in the ferro-resonance circuit so that a larger compensating winding is necessary.

Figure 1:
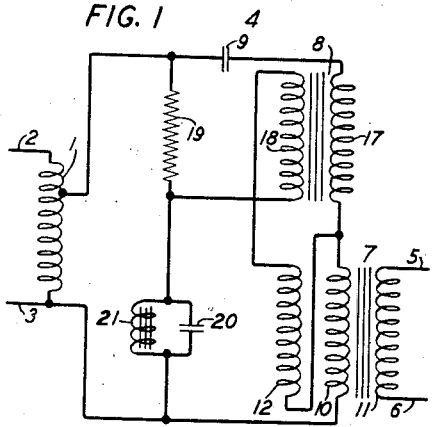
Fig. 1 is a diagrammatic view of a voltage regulator constructed in accordance with the invention.

Referring to Fig. 1 of the drawing an autotransformer 1 is connected across two supply connectors 2 and 3. The supply connectors 2 and 3 are connected to any suitable source of alternating current power. A voltage regulator 4 is connected between the autotransformer 1 and a load circuit comprising conductors 5 and 6.

Figure 2:
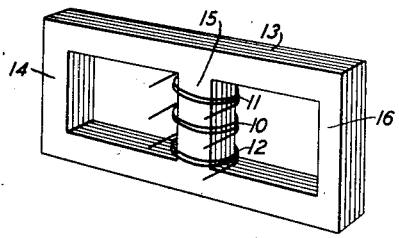
Fig. 2 is a diagrammatic view of a core employed in the voltage regulator shown in Fig. 1.

The regulator 4 comprises a transformer 7, a retardation coil 8 and a condenser 9. The transformer 7 comprises a primary winding 10, a secondary winding 11 and a compensating winding 12. The core 13 of the transformer 7 is illustrated in Fig. 2 of the drawing. The core 13 shown in Fig. 2 in the drawing is provided with three legs 14, 15 and 16 connected at each end thereof. The windings 12, 10 and 11 of the transformer 7 are mounted on the middle leg 15. The retardation coil 8 comprises windings 17 and 18 which are both mounted on the central leg of a three-legged core similar to the core shown in Fig. 2 of the drawing. The condenser 9, the main winding 17 of the retardation coil 8 and the primary winding 10 of the transformer 7 form a ferro-resonance circuit which is connected across the autotransformer 1. This ferro-resonance circuit is operated above the jumping point so that reduced voltage changes are effected across the primary winding for any voltage changes on the source comprising the autotransformer.

The capacity reactance of the condenser 9 is greater at all times than the combined inductive reactance of the retardation coil 8 and the transformer 7. The total impedance of the ferro-resonance circuit is essentially the difference between the reactance of the condenser 9 and the reactances of the retardation coil 8 and the transformer 7. The sum of the inductance of the retardation coil 8 and the transformer 7 decreases with increase in the supply circuit voltage so that if the supply circuit voltage is increased the total impedance in the ferro-resonance circuit increases and the current flow, therefore, does not increase at as great a rate as that of the supply circuit voltage increase. This relatively small increase of current through the transformer together with the decreased impedance of the transformer results in a much smaller percentage of increase in the transformer voltage as compared with the increase in voltage of the supply circuit voltage. An opposite effect takes place in case the supply circuit voltage falls below normal value. In other words, the transformer voltage changes when controlled solely by the ferro-resonance circuit are much less than the supply circuit voltage changes.

A compensating circuit comprising a resistance element 19, the second winding 18 of the retardation coil 8, compensating winding 12 and the primary winding 10 of the transformer 7 is connected across the autotransformer 1 for compensating the transformer 7 to maintain the output voltage thereof substantially constant. The windings 18 and 12 are connected in series opposition. Moreover, the flux produced by the compensating winding 12 in the transformer core 13 opposes the flux produced by the primary winding 10. However, the flux produced by the compensating winding 12 is less than the flux produced by the primary winding 10 but varies at a greater rate for any change in voltage on the autotransformer 1. The compensating circuit so reduces the transformer output voltage as to maintain this voltage constant irrespective of the supply circuit voltage variations. The resistance element 19 is provided in series with the windings 18 and 12 so as to effect adjustment of the action of the compensating coil 12 in the transformer 7. As before set forth the retardation coil 8 has a core which operates above the knee of the magnetization curve. The core 13 of the transformer 7 may be operated above or below the knee of the magnetization curve as desired.

A temperature frequency compensating circuit comprising a condenser 20 in shunt with a retardation coil 21 is connected across the windings 18, 12 and 10 as shown in Fig. 1 of the drawing. The temperature frequency compensating circuit is tuned to the normal frequency of the alternating current source and serves to compensate the regulator for any changes in frequency of the source or any temperature change. If the frequency of the current supplied by the autotransformer 1 tends to increase the voltage output tends to increase and the compensating circuit comprising the condenser 20 and the retardation coil 21 is untuned so that the current flow through it becomes leading. The leading current drawn by the frequency temperature compensating circuit offsets the lagging current drawn through the resistance 19 to assist the compensating coil 12 in producing a flux to oppose the flux of the primary winding 10. This serves to maintain the resultant magnetic flux in the transformer substantially constant. If the frequency of the current supplied by the autotransformer 1 tends to fall below normal value, then the voltage supplied by the transformer 1 tends to be reduced in value. The reduction in frequency of the current from the source untunes the temperature frequency compensating circuit so that a lagging current is drawn. The lagging current drawn by the temperature frequency compensating circuit adds to the lagging current drawn through resistance 19 to reduce the action of the flux produced by the compensating winding 12 in opposing the flux of the primary winding 10. This action serves to increase the effectiveness of the primary winding 10 so that substantially constant magnetic flux is maintained in the transformer.

In case of temperature changes the capacities of the condensers in the voltage regulator are varied. An increase in temperature reduces the capacity of the condensers whereas a temperature decrease increases the capacity of the condensers. Whatever change in the ferro-resonance circuit is produced by change in capacity of the condenser 9 by temperature changes, an opposite and equal effect in the regulating operation is produced by the temperature changes on the condenser 20. If the temperature increases and the capacity of the condenser 9 is reduced, the output voltage tends to decrease. At the same time the condenser 20 is so changed that a lagging current flows to aid the lagging current drawn through the resistance 19 and opposes the action of the compensating winding 12 in producing flux to oppose the flux of the primary winding 10. This change in the action of the compensating winding 12 serves to counteract the change in capacity of the condenser 9 in its effect on the ferro-resonance circuit. An opposite effect takes place in case the capacity of condenser 9 is increased by reason of a temperature decrease.

Figure 4:
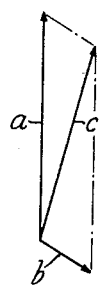
Figs. 4 and 5 are vector diagrams illustrating the flux changes to maintain constant load voltage irrespective of load changes.
Figure 5:
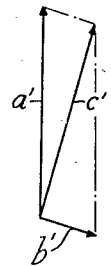

In Figs. 4 and 5 of the drawing are shown vector diagrams illustrating the operation of the voltage regulator in maintaining constant voltage irrespective of load changes. In the vector diagrams shown it is assumed that the supply voltage remains substantially constant.

The vector $a$ in Fig. 4 represents the main or primary flux in the leg 15 of the core 13 and the vector $b$ represents the opposing flux produced by the main compensating circuit. The vector $c$ represents the resultant flux. The phase angle between the main flux and the compensating flux in the leg of the core 13 depends largely upon the effective resistance in the main or primary circuit. When a light load is on the regulator as indicated in Fig. 4, the vector $b$ is nearly 180 degrees out of phase with the vector $a$. When the load is heavy as indicated by the vector diagram shown in Fig. 5 of the drawing the resistance component of the main or primary circuit is greatly increased and the compensating flux is not nearly so much out of phase with the main flux. In the diagram of Fig. 5 the main flux is represented by the vector $a'$, the compensating flux is represented by the vector $b'$ and the resultant flux is represented by the vector $c'$. The load resistance acts essentially as a shunt across the resistance of the main or primary winding on the leg 15 of the core 13. When the load increases the ampere turns producing the main flux is reduced. However, on account of the reduced phase angle between the vectors $a'$ and $b'$ there is not so much of the main flux opposed by the compensating flux and the resultant flux $c'$ is essentially the same value as the flux $c$. If so desired, the reactance in the main and the compensating circuits could be arranged to effect an increase in load voltage with increase in load.

Figure 3:
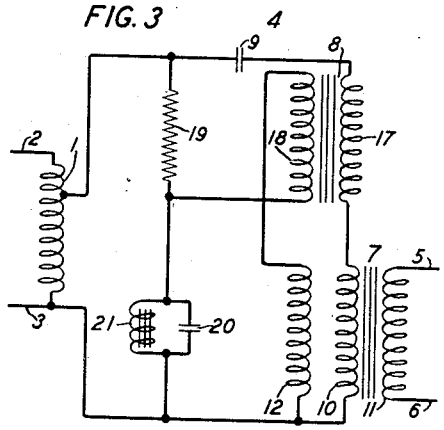
Fig. 3 is a modification of the regulator shown in Fig. 1.

The circuit shown in Fig. 3 of the drawing is the same as the circuit shown in Fig. 1 of the drawing with the exception that the compensating circuit is not connected in series with the transformer primary winding. Similar parts in Fig. 4 to those shown in Fig. 1 have been indicated by like reference characters. When the compensating circuit is not connected in series with the transformer winding 10 a number of turns should be added to the compensating winding 12.

Modifications in the apparatus and in the arrangement and location of parts may be made within the spirit and scope of the invention and such modifications are intended to be covered by the appended claims.

The subject-matter of this application is related to that of my application Serial No. 354,999 and Serial No. 355,000, filed concurrently herewith.

What is claimed is:

1. In a voltage regulator connected between an alternating current supply circuit and a load circuit, a ferro-resonance circuit the impedance of which is capacitive during normal operation connected to said supply circuit, a transformer having a first winding in the ferro-resonance circuit, an auxiliary winding, a load circuit connected to said transformer, control means for energizing said auxiliary winding according to variations in the supply circuit voltage for producing a flux less than and opposing the flux due to current in said first winding but which varies at a greater rate for supply circuit voltage changes, and means for minimizing voltage variations in said ferro-resonance circuit due to the current in said auxiliary winding.

2. In a voltage regulator connected between an alternating current supply circuit and a load circuit, a ferro-resonance circuit the impedance of which is capacitive during normal operation connected to said supply circuit, a transformer having a primary winding in the ferro-resonance circuit, an auxiliary winding and a secondary winding connected to said load circuit, control means for energizing said auxiliary winding according to variations of the supply circuit voltage for producing a flux less than and opposing the primary winding flux but which varies at a greater rate for supply circuit voltage changes, means for substantially preventing current changes in said ferro-resonance circuit because of voltage induced therein due to current in said auxiliary winding, and means for governing said control means to compensate for frequency variations of the supply circuit and temperature variations.

3. In a voltage regulator connected between an alternating current supply circuit and a load circuit, a series ferro-resonance circuit connected to said supply circuit, a transformer having a first winding in the ferro-resonance circuit, a load circuit connected to said transformer, said ferro-resonance circuit being operated above the jumping point of the characteristic curve, means operated according to variations in the supply circuit voltage for opposing the flux due to said first winding by a flux of less value but which varies at a greater rate, and means for substantially preventing preventing current variations in said ferro-resonance circuit due to the operation of said last-mentioned means.

4. In a voltage regulator connected between an alternating current supply circuit and a load circuit, a ferro-resonance circuit connected to said supply circuit, a transformer having a primary winding in said ferro-resonance circuit, a secondary winding and an auxiliary winding, said ferro-resonance circuit operating above the jumping point of the characteristic curve, means for energizing said auxiliary winding by the supply circuit to produce a flux opposing and less than the primary flux but changing at a greater rate than the primary winding flux, and means for inducing in said ferro-resonance circuit an electromotive force substantially equal to and opposing the electromotive force induced therein due to current flowing in said auxiliary winding.

5. In a voltage regulator connected between an alternating current supply circuit and a load circuit, a two-winding iron-cored retardation coil, a transformer having a primary winding, a secondary winding and an auxiliary winding, a main control circuit connected across said supply circuit and comprising a condenser, one winding of said retardation coil and the primary winding of said transformer, said main circuit being in the form of a ferro-resonance circuit operating above the characteristic jumping point and a regulating circuit energized by the supply circuit and comprising a resistance element, the second winding of the retardation coil and the auxiliary winding of the transformer, the second winding of the retardation coil and the auxiliary winding of the transformer being connected in series opposition to minimize the voltages induced in the ferro-resonance circuit and the flux of said auxiliary winding being in opposition to and less than the flux of the primary winding but changing at a greater rate than the primary winding flux for supply circuit voltage changes.

6. In a voltage regulator connected between an alternating current supply circuit and a load circuit, a two-winding iron-cored retardation coil, a transformer having a primary winding, a secondary winding and an auxiliary winding, a main control circuit connected across said supply circuit and comprising a condenser, one winding of said retardation coil and the primary winding of said transformer, said main circuit being in the form of a ferro-resonance circuit operating above the characteristic jumping point, a regulating circuit energized by the supply circuit and comprising a resistance element, the second winding of the retardation coil and the auxiliary winding of the transformer, the second winding of the retardation coil and the auxiliary transformer winding being connected in series opposition to minimize the voltages induced in the ferro-resonance circuit and the flux of said auxiliary winding being in opposition to and less than the flux of the primary winding but changing at a greater rate than the primary winding flux upon supply circuit voltage changes, and a tuned circuit comprising a condenser and an inductance coil varying the regulating circuit to compensate for frequency and temperature changes.

7. In a voltage regulator connected to an alternating current supply circuit for supplying substantially constant voltage to a load circuit, a two-winding retardation coil, a transformer having a primary winding, a secondary winding and an auxiliary winding, a series ferro-resonance circuit connected across said supply circuit and comprising a condenser, one winding of said retardation coil and the primary winding of said transformer, said ferro-resonance circuit operating above the jumping point of its characteristic curve, a regulating circuit energized by the supply circuit and comprising a resistance element, the second winding of said retardation coil and the auxiliary winding of said transformer, the second winding of the retardation coil and the auxiliary winding of the transformer being connected in series opposition to minimize the voltages induced in the ferro-resonance circuit and the flux of said auxiliary winding being in opposition to and less than the flux of the primary winding but changing at a greater rate than the primary winding flux for supply circuit voltage changes, and means comprising a tuned circuit for varying the energization of said auxiliary winding and the second winding of the retardation coil to compensate for supply circuit frequency changes and temperature changes.

BRUCE E. STEVENS.